United States Patent
Chang et al.

(10) Patent No.: US 10,108,295 B2
(45) Date of Patent: Oct. 23, 2018

(54) INPUT DEVICE INCLUDING SENSING ELECTRODES

(71) Applicant: Acer Incorporated, New Taipei (TW)

(72) Inventors: Chia-Lun Chang, New Taipei (TW); Chueh-Pin Ko, New Taipei (TW)

(73) Assignee: Acer Incorporated, New Taipei (TW)

( * ) Notice: Subject to any disclaimer, the term of this patent is extended or adjusted under 35 U.S.C. 154(b) by 0 days.

(21) Appl. No.: 15/489,605

(22) Filed: Apr. 17, 2017

(65) Prior Publication Data

US 2018/0203561 A1  Jul. 19, 2018

(30) Foreign Application Priority Data

Jan. 16, 2017  (TW) .............................. 106101342 A (51) Int. Cl.
*G06F 3/045* (2006.01)
*G06F 3/041* (2006.01)
*G06F 3/044* (2006.01)

(52) U.S. Cl.
CPC ............ *G06F 3/0416* (2013.01); *G06F 3/044* (2013.01)

(58) Field of Classification Search
CPC ................................ G06F 3/0416; G06F 3/044
USPC ........................................................ 345/174
See application file for complete search history.

(56) References Cited

U.S. PATENT DOCUMENTS

| | | | | |
|---|---|---|---|---|
| 2015/0091815 A1* | 4/2015 | Michaelis | ........... | G06F 3/03545 345/173 |
| 2015/0317001 A1* | 11/2015 | Ben-Bassat | ......... | G06F 3/03545 345/179 |
| 2016/0048225 A1* | 2/2016 | Curtis | ..................... | G06F 3/044 345/173 |
| 2016/0238433 A1* | 8/2016 | Kuo | ....................... | G01G 19/52 |
| 2017/0031521 A1* | 2/2017 | Drake | ................... | G06F 3/0418 |

FOREIGN PATENT DOCUMENTS

| | | |
|---|---|---|
| CN | 103677335 | 3/2014 |
| CN | 104808816 | 7/2015 |
| CN | 105528094 | 4/2016 |
| TW | 201530361 | 8/2015 |
| TW | 201610763 | 3/2016 |
| TW | M531613 | 11/2016 |

* cited by examiner

*Primary Examiner* — Jonathan Blancha
(74) *Attorney, Agent, or Firm* — J.C. Patents (57) ABSTRACT

An input device including a housing, a plurality of sensing electrodes, a conductive element, a sensing circuit, a control circuit, and a transmitting circuit is provided. The sensing electrodes are disposed on an inner edge of the housing. The conductive element is used for placing into the housing and is surrounded by the sensing electrodes to couple with the sensing electrodes. The sensing circuit is coupled to the sensing electrodes to scan capacitance values of the sensing electrodes and correspondingly provide raw sensing data. The control circuit is coupled to the sensing circuit to receive the raw sensing data and provide a touch operation signal according to the raw sensing data. The transmitting circuit is coupled to the control circuit and a host for transmitting the touch operation signal to the host.

10 Claims, 7 Drawing Sheets

INPUT DEVICE INCLUDING SENSING ELECTRODES

CROSS-REFERENCE TO RELATED APPLICATION

This application claims the priority benefit of Taiwan application serial no. 106101342, filed on Jan. 16, 2017. The entirety of the above-mentioned patent application is hereby incorporated by reference herein and made a part of this specification.

BACKGROUND OF THE INVENTION

Field of the Invention

The invention relates to an input device, and in particular, an input device including sensing electrodes.

Description of Related Art

As technology advances, mobile electronic devices with touch screens are more and more commonly used in people's life. Based on users' needs, the size of touch screens also gradually increases. To meet users' habits of use, applications of touch styluses also gradually increase. Generally, touch styluses that are used with touch screens can be largely categorized into active and passive touch styluses. The passive touch styluses do no consume power, but they are unable to provide a wide range of user's experience due to their simple structures.

SUMMARY OF THE INVENTION

The invention provides an input device that includes sensing electrodes disposed on an inner edge of a housing and determines an operation behavior of a user through a coupled conductive element to correspondingly provide a touch operation signal to a host.

The input device of the invention includes a housing, a plurality of sensing electrodes, a conductive element, a sensing circuit, a control circuit, and a transmitting circuit. The sensing electrodes are disposed on an inner edge of the housing. The conductive element is used for placing into the housing and is surrounded by the sensing electrodes to couple with the sensing electrodes. The sensing circuit is coupled to the sensing electrodes to scan capacitance values of the sensing electrodes and correspondingly provide raw sensing data. The control circuit is coupled to the sensing circuit to receive the raw sensing data and provide a touch operation signal according to the raw sensing data. The transmitting circuit is coupled to the control circuit and a host for transmitting the touch operation signal to the host.

In light of the above, through the capacitance values of the sensing electrodes coupling with the conductive element, the input device of the embodiments of the invention determines a contact area and a contact position of the sensing electrodes and the conductive element to further determine the operation behavior of the user and correspondingly provide the touch operation signal to the host. Accordingly, the user can write/paint through the novel operation mode to realize the user's experience of real writing strokes.

To provide a further understanding of the aforementioned and other features and advantages of the invention, exemplary embodiments, together with the reference drawings, are described in detail below.

DESCRIPTION OF THE EMBODIMENTS

Figure 1:
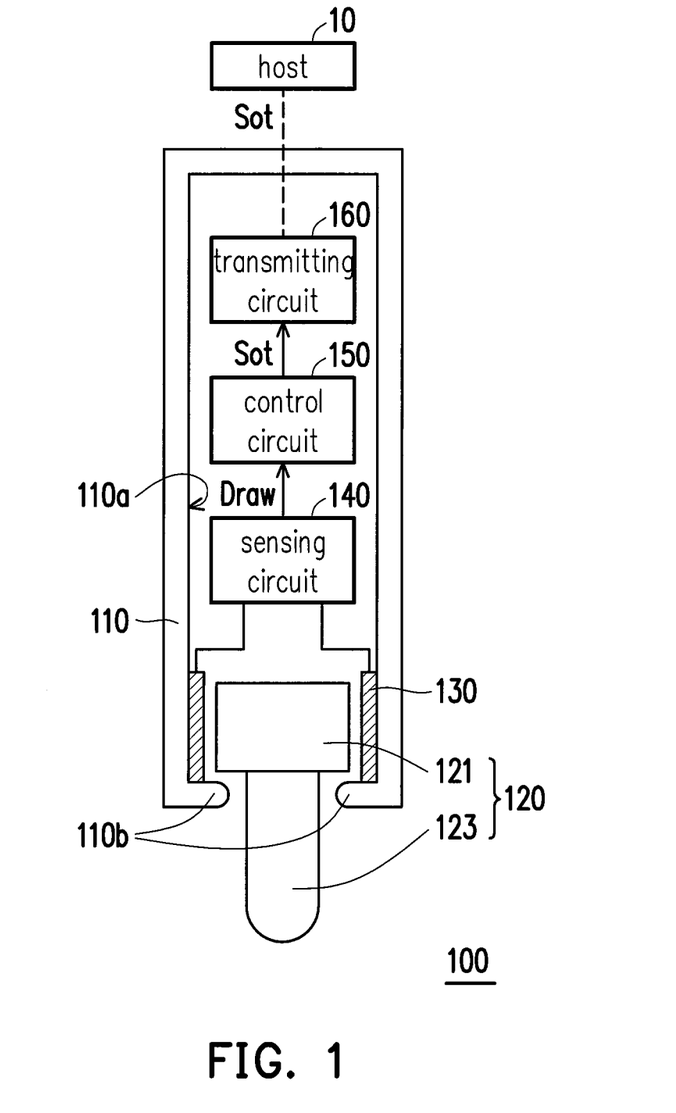
FIG. 1 is a schematic system diagram illustrating an input device according to an embodiment of the invention.

FIG. 1 is a schematic system diagram illustrating an input device according to an embodiment of the invention. Referring to FIG. 1, in the present embodiment, an input device 100 includes a housing 110, a conductive element 120, a touch detecting layer 130, a sensing circuit 140, a control circuit 150, and a transmitting circuit 160. The touch detecting layer 130 includes a plurality of sensing electrodes (not illustrated), and the touch detecting layer 130 is bent and disposed on an inner edge 110a of the housing 110.

The conductive element 120 is used for placing into the housing 110 and is surrounded by the touch detecting layer 130 (i.e., surrounded by the sensing electrodes of the touch detecting layer 130) to couple with the sensing electrodes of the touch detecting layer 130. The sensing circuit 140 is coupled to the sensing electrodes of the touch detecting layer 130 to scan capacitance values of the sensing electrodes of the touch detecting layer 130 and correspondingly provide raw sensing data Draw. The control circuit 150 is coupled to the sensing circuit 140 to receive the raw sensing data Draw and provide a touch operation signal Sot according to the raw sensing data Draw. The transmitting circuit 160 is coupled to the control circuit 150 and a host 10 for transmitting the touch operation signal Sot to the host 10.

In the present embodiment, the conductive element 120 includes a sensing segment 121 and a contact segment 123. The sensing segment 121 is used to couple with the sensing electrodes of the touch detecting layer 130, and here, the sensing segment 121 is in a cylindrical shape, for example. However, the embodiments of the invention are not limited hereto. In other words, the sensing segment 121 may be a sphere, a cone, an ellipsoid, or in a similar three-dimensional shape. The contact segment 121 is fixed on the sensing segment 123 and is exposed out of the housing 110, wherein the contact segment 123 is in a cylindrical shape, for example, and one end of the cylindrical shape is fixed on the sensing segment 121.

In the present embodiment, the housing 110 includes a fixture part 110b at one end on the inner edge 110a for fixing the conductive element 120 after the conductive element 120 is placed into the housing 110.

In the present embodiment, regarding the touch detecting layer 130, the capacitance values of the sensing electrodes on the touch detecting layer 130 are subject to influence of the conductive element 120. In other words, the capacitance values of the sensing electrodes vary according to whether they are touched by the conductive element 120. Accordingly, the control circuit 150 determines a site on the touch detecting layer 130 that is touched by the conductive element 120 according to the raw sensing data Draw. Next, according to the site on the touch detecting layer 130 that is touched by the conductive element 120, the control circuit 150 determines an area and a position on the touch detecting layer 130 that are contacted by the conductive element 120. Lastly, according to the area and the position on the touch detecting layer 130 that are contacted by the conductive element 120, the control circuit 150 determines an operation behavior of a user and correspondingly provides the touch operation signal Sot.

Furthermore, when at least one of a contact area and a contact position of the conductive element 120 and the touch detecting layer 130 is different, it means that the user wishes to switch to a different operation mode or use a different operation behavior, such that the control circuit 150 provides a different touch operation signal Sot. Wherein, the control circuit 150 looks up the touch operation signal Sot corresponding to the contact area and/or the contact position through a lookup table.

Figure 2A:
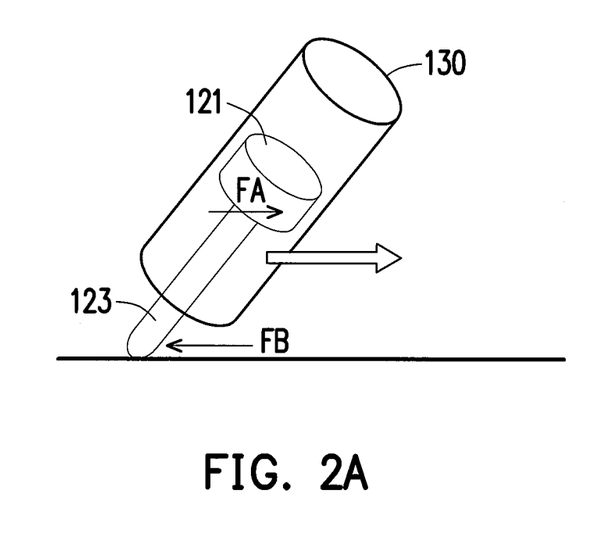
FIG. 2A to FIG. 2C are schematic diagrams illustrating a first operation method of the input device according to an embodiment of the invention.
Figure 2B:
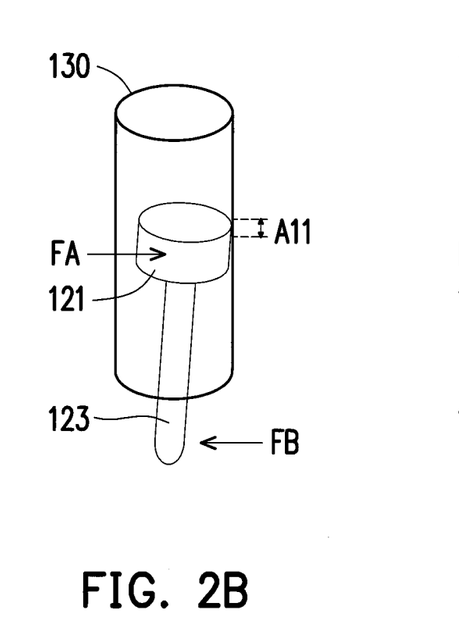
Figure 2C:
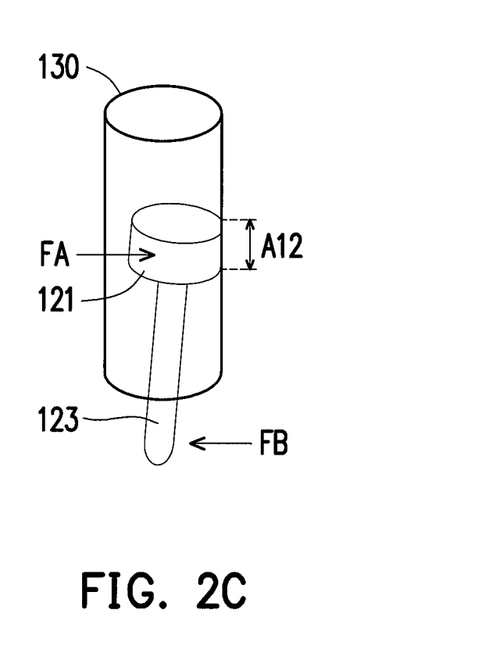

FIG. 2A to FIG. 2C are schematic diagrams illustrating a first operation method of the input device according to an embodiment of the invention. Referring to FIG. 1 and FIG. 2A to FIG. 2C, in the present embodiment, the input device is, for example, applied to a stylus head of an active stylus. During writing, the stylus head (i.e., the contact segment 123 of the conductive element 120) is subject to a force (as shown by an acting force FB), and the sensing segment 121 of the conductive element 120 generates a corresponding acting force (as shown by an acting force FA). Moreover, when the subjected force (as shown by the acting force FB) is different, the sensing segment 121 of the conductive element 120 is deformed according to a magnitude of the corresponding acting force (as shown by the acting force FA), which further changes the contact area with the touch detecting layer 130. In detail, when the acting force FB is smaller, the contact area of the sensing segment 121 and the touch detecting layer 130 becomes smaller (as shown by a contact area A11), which indicates that the user wishes to draw a thinner stroke. When the acting force FB is greater, the contact area of the sensing segment 121 and the touch detecting layer 130 becomes bigger (as shown by a contact area A12), which indicates that the user wishes to draw a thicker stroke.

Figure 3A:
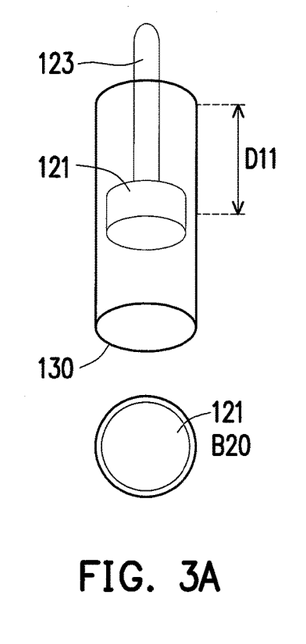
FIG. 3A to FIG. 3C are schematic diagrams illustrating a second operation method of the input device according to an embodiment of the invention.
Figure 3B:
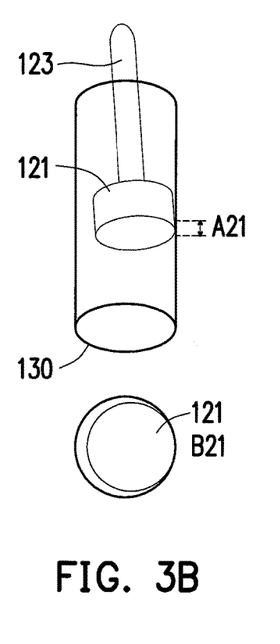
Figure 3C:
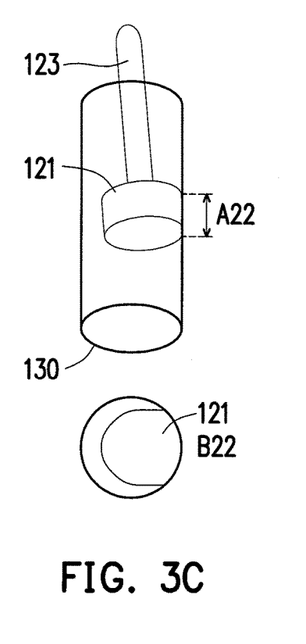

FIG. 3A to FIG. 3C are schematic diagrams illustrating a second operation method of the input device according to an embodiment of the invention. Referring to FIG. 1 and FIG. 3A to FIG. 3C, in the present embodiment, the input device is, for example, applied to a stylus tail of the active stylus or a joystick. When a stylus barrel (i.e., the contact segment 123 of the conductive element 120) is swung in a horizontal direction, the contact position largely remains unchanged (as shown by a distance D11), but the contact area (as shown by contact areas A21 and A22) changes, and the contact area (as shown by the contact areas A21 and A22) varies according to the magnitude of the acting force.

As shown by contact states B20, B21, and B22, when there is no acting force, the sensing segment 121 of the conductive element 120 does not contact the touch detecting layer 130; when the acting force is smaller, the contact area of the sensing segment 121 of the conductive element 120 that contacts the touch detecting layer 130 is smaller; when the acting force is greater, the contact area of the sensing segment 121 of the conductive element 120 that contacts the touch detecting layer 130 is bigger.

In an embodiment of the invention, according to the magnitude and a direction of the acting force, the input device 100 may be applied to the touch operation signal Sot for volume adjustment and an operation of slide page scrolling.

Figure 4A:
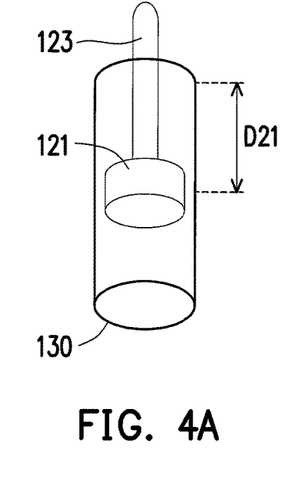
FIG. 4A to FIG. 4C are schematic diagrams illustrating a third operation method of the input device according to an embodiment of the invention.
Figure 4B:
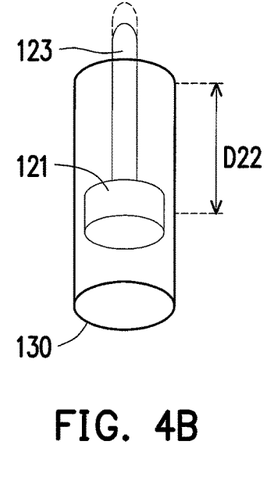
Figure 4C:
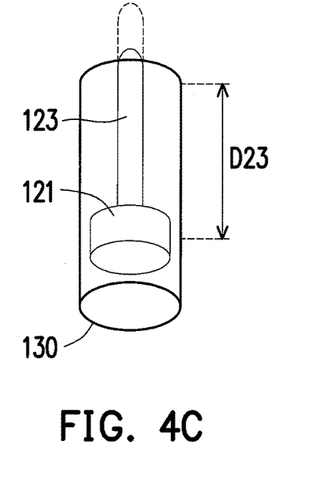

FIG. 4A to FIG. 4C are schematic diagrams illustrating a third operation method of the input device according to an embodiment of the invention. Referring to FIG. 1 and FIG. 4A to FIG. 4C, in the present embodiment, the input device is, for example, applied to the stylus tail of the active stylus or the joystick. When the stylus barrel (i.e., the contact segment 123 of the conductive element 120) is pressed in a vertical direction, the contact area largely remains unchanged, but the contact position (as shown by distances D21 to D23) changes, and the contact position (as shown by the distances D21 to D23) varies according to the magnitude of the acting force.

For example, the contact positions of the distances D21 and D22 correspond to left/right buttons of a mouse or an activation operation of a sound control mode, which is a temporary behavior. The contact positon of the distance D23 corresponds to activation of an eraser application. Moreover, through a design of a fixture mechanism, the contact segment 121 of the conductive element 120 is securely maintained in a state of the distance D23 after a force is applied. In addition, the press design of the distances D21 to D23 is also applicable to chess.

Figure 5:
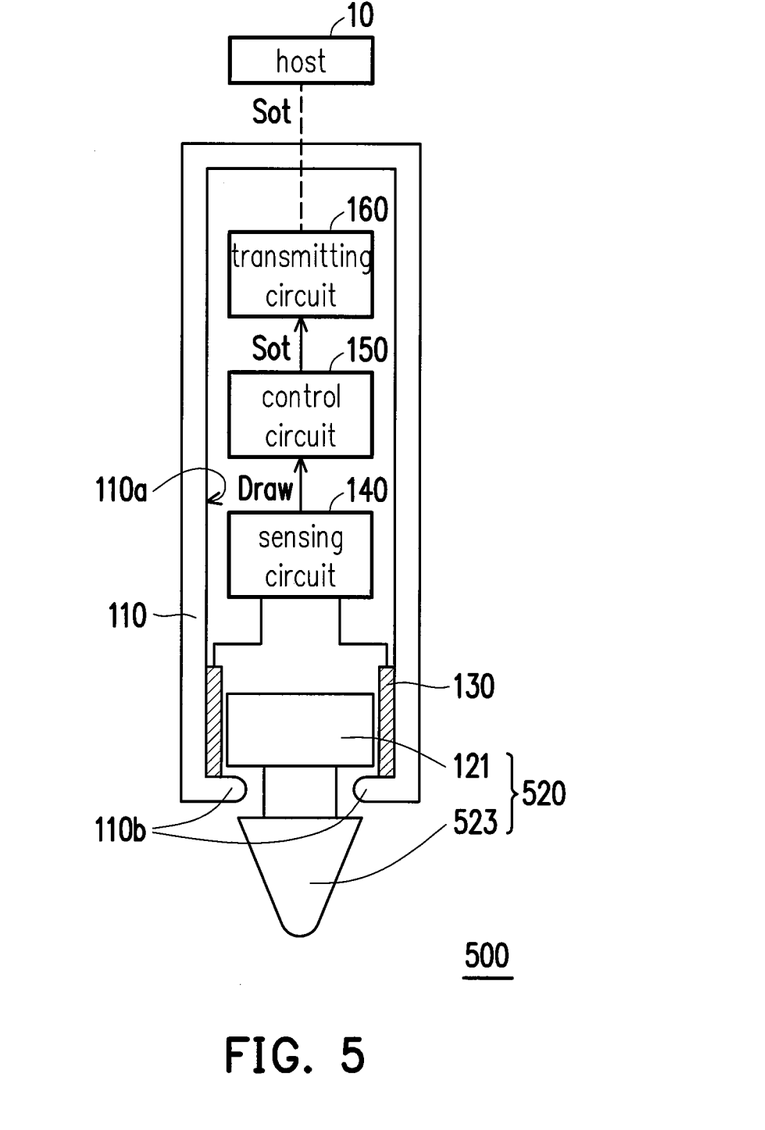
FIG. 5 is a schematic system diagram illustrating an input device according to another embodiment of the invention.

FIG. 5 is a schematic system diagram illustrating an input device according to another embodiment of the invention. Referring to FIG. 1 and FIG. 5, an input device 500 is largely identical. The difference therebetween lies in a contact segment 523 of a conductive element 520. The same or similar components are marked with the same or similar numerals. In the present embodiment, the contact segment 523 of the conductive element 520 is in a cone shape, and a bottom face of the cone-shaped contact segment 523 is fixed on the sensing segment 121. Moreover, a central line of the cone-shaped contact segment 523 and a central line of the sensing segment 121 in the cylindrical shape are on a same straight line.

Figure 6A:
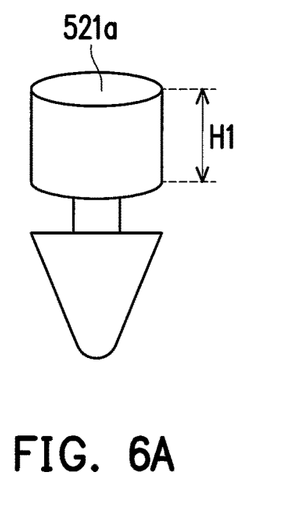
FIG. 6A to FIG. 6C are schematic diagrams illustrating a first operation method of the input device according to another embodiment of the invention.
Figure 6B:
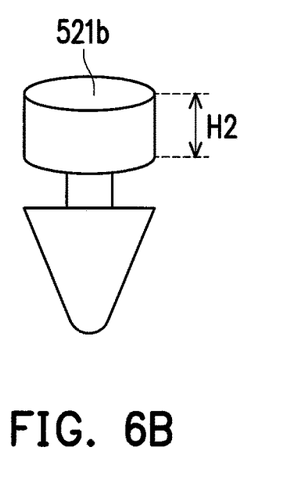
Figure 6C:
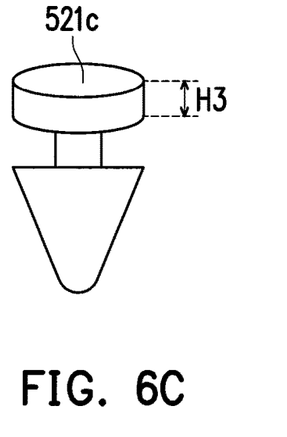

FIG. 6A to FIG. 6C are schematic diagrams illustrating an operation method of the input device according to another embodiment of the invention. Referring to FIG. 5 and FIG. 6A to FIG. 6C, in the present embodiment, it is supposed that the conductive element 520 is replaceable, and different sensing segments (e.g., sensing segments 521a to 521c) have different heights (as shown by H1 to H3). When the conductive element 520 is installed to the input device 500, the sensing circuit 140 determines the contact area of the sensing segment (e.g., the sensing segments 521a to 521c) and the touch detecting layer 130 to determine an initial capacitance value of the sensing segment (e.g., the sensing segments 521a to 521c) and the touch detecting layer 130 to further determine a writing/painting mode that the user wishes to use. Wherein, the initial capacitance value is a capacitance value of the sensing segment (e.g., the sensing segments 521a to 521c) and the touch detecting layer 130 when the contact segment 523 is not subject to a force. For example, the height H1 corresponds to a fountain pen writing mode; the height H2 corresponds to a watercolor painting mode; and the height H3 corresponds to a pencil writing mode.

After the writing/painting mode is determined, according to a variation in the contact area of the sensing segment (e.g., the sensing segments 521a to 521c) and the touch detecting layer 130, the magnitude of the force applied by the user is determined, and the touch operation signal Sot is correspondingly provided. Accordingly, writing/painting strokes are modified to realize a user's experience of real writing strokes.

Figure 7:
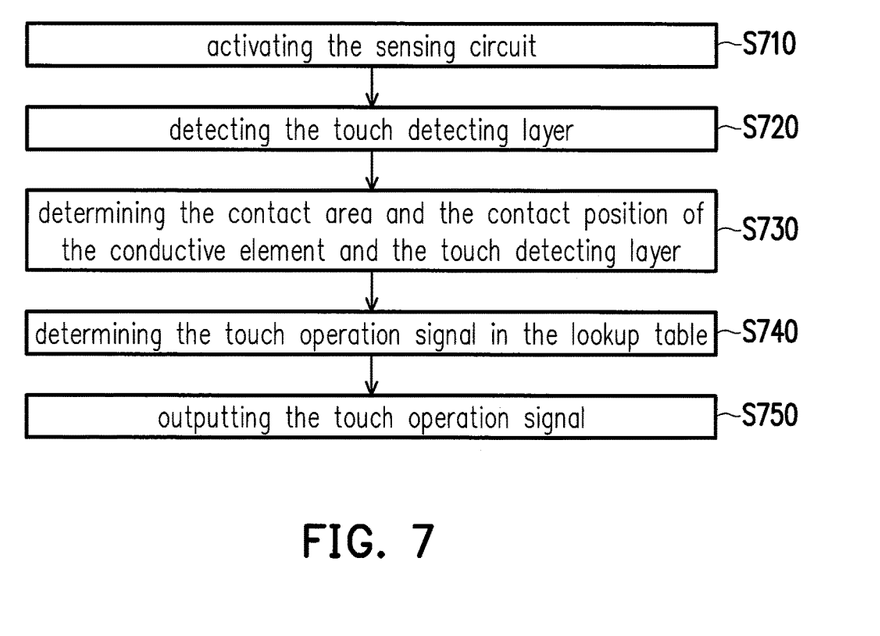
FIG. 7 is a flowchart illustrating an operation method of the input device according to an embodiment of the invention.

FIG. 7 is a flowchart illustrating an operation method of the input device according to an embodiment of the invention. Referring to FIG. 7, in the present embodiment, the operation method of the input device includes the following steps. In step S710, the sensing circuit is activated. In step S720, the touch detecting layer is detected. In step S730, the contact area and the contact position of the conductive element and the touch detecting layer are determined. In step S740, the touch operation signal is determined in the lookup table. In step S750, the touch operation signal is output.

Figure 8:
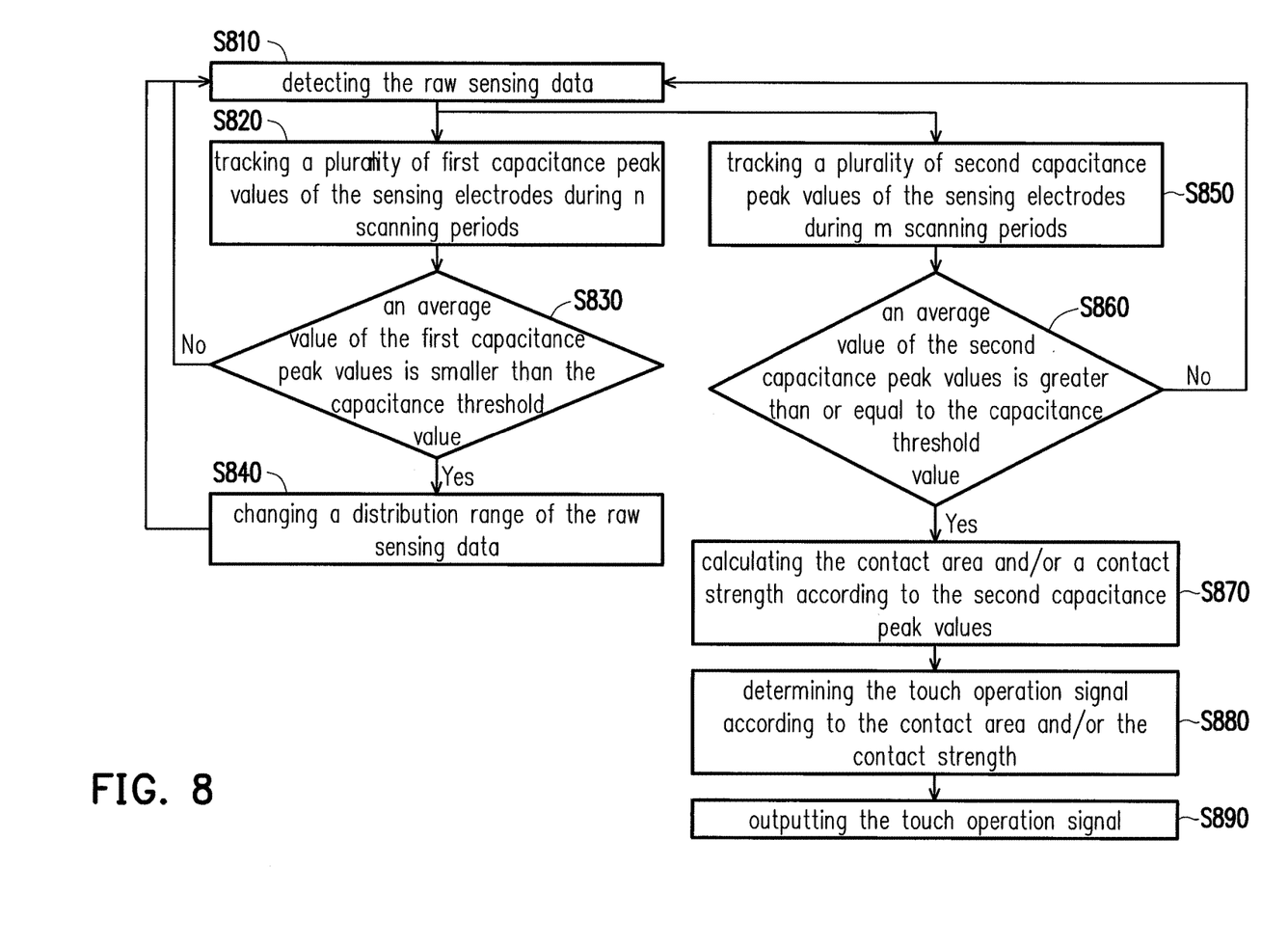
FIG. 8 is a flowchart illustrating an operation method of the control circuit according to an embodiment of the invention.

FIG. 8 is a flowchart illustrating an operation method of the control circuit according to an embodiment of the invention. Referring to FIG. 8, in the present embodiment, the operation method of the control circuit includes the following steps. In step S810, the raw sensing data is detected. In step S820, a plurality of first capacitance peak values of the sensing electrodes of the touch detecting layer during n scanning periods are tracked, wherein n is a positive integer and is smaller than or equal to 2. In step S830, it is determined whether a first average value of the first capacitance peak values is smaller than a capacitance threshold value.

When the first average value of the first capacitance peak values is smaller than the capacitance threshold value (i.e., a determination result of step S830 is "yes"), a distribution range of the raw sensing data is changed (step S840). Conversely, when the first average value of the first capacitance peak values is greater than or equal to the capacitance threshold value (i.e., the determination result of step S830 is "no"), returning to step S810.

In step S850, a plurality of second capacitance peak values of the sensing electrodes of the touch detecting layer during m scanning periods are tracked, wherein m is a positive integer and is greater than 2. In step S860, it is determined whether a second average value of the second capacitance peak values is greater than or equal to the capacitance threshold value. When the second average value of the second capacitance peak values is greater than or equal to the capacitance threshold value (i.e., a determination result of step S860 is "yes"), step S870 is executed. Conversely, when the second average value of the second capacitance peak values is smaller than the capacitance threshold value (i.e., the determination result of step S860 is "no"), returning to step S810.

In step S870, according to the second capacitance peak values, the contact area and/or a contact strength is calculated. In step S880, according to the contact area and/or the contact strength, the touch operation signal is determined. In step S890, the touch operation signal is output.

Wherein, steps S820 to S840 and steps S850 to S890 may proceed simultaneously. Alternatively, steps S820 to S840 and steps S850 to S890 may proceed optionally, or steps S820 to S840 and steps S850 to S890 may proceed alternately, which may be determined according to a circuit design. Moreover, the orders of the foregoing steps S710 to S750 and S810 to S890 are merely illustrative and the embodiments of the invention are not limited hereto. In addition, reference may be made to the description of the embodiments of FIG. 1, FIGS. 2A to 2C, FIGS. 3A to 3C, FIGS. 4A to 4C, FIG. 5, and FIGS. 6A to 6C for details of the foregoing steps S710 to S750 and S810 to S890, which shall not be repeatedly described here.

In summary of the above, through the capacitance values of the sensing electrodes coupling with the conductive element, the input device of the embodiments of the invention determines the contact area and the contact position of the sensing electrodes and the conductive element to further determine the operation behavior of the user and correspondingly provide the touch operation signal to the host. Accordingly, the user can write/paint through the novel operation mode to realize the user's experience of real writing strokes.

Although the invention is disclosed as the embodiments above, the embodiments are not meant to limit the invention. Any person skilled in the art may make slight modifications and variations without departing from the spirit and scope of the invention. Therefore, the protection scope of the invention shall be defined by the claims attached below.

What is claimed is:

1. An input device comprising:
    a housing;
    a plurality of sensing electrodes disposed on an inner edge of the housing;
    a conductive element used for placing into the housing and surrounded by the sensing electrodes to couple with the sensing electrodes;
    a sensing circuit coupled to the sensing electrodes to scan capacitance values of the sensing electrodes and correspondingly provide raw sensing data;
    a control circuit coupled to the sensing circuit to receive the raw sensing data and provide a touch operation signal according to the raw sensing data, wherein the control circuit provides a different touch operation signal when a contact position of the conductive element and the sensing electrodes varies; and
    a transmitting circuit coupled to the control circuit and a host for transmitting the touch operation signal to the host.

2. The input device according to claim 1, wherein the conductive element comprises:
    a sensing segment used to couple with the sensing electrodes; and
    a contact segment fixed on the sensing segment.

3. The input device according to claim 2, wherein the sensing segment is in a cylindrical shape, the contact segment is in a cone shape, a bottom face of the cone shape is fixed on the sensing segment, and a central line of the cone shape and a central line of the cylindrical shape are on a same straight line.

4. The input device according to claim 2, wherein the sensing segment and the contact segment are respectively in a cylindrical shape, and one end of the cylindrical shape is fixed on the sensing segment.

5. The input device according to claim 1, wherein the housing further comprises a fixture part positioned on the inner edge for fixing the conductive element after the conductive element is placed into the housing.

6. The input device according to claim 1, wherein the control circuit provides a different touch operation signal when a contact area of the conductive element and the sensing electrodes varies.

7. The input device according to claim 6, wherein the control circuit looks up the touch operation signal corresponding to the contact area through a lookup table.

8. The input device according to claim 1, wherein the control circuit looks up the touch operation signal corresponding to the contact position through a lookup table.

9. The input device according to claim 1, wherein the control circuit tracks a plurality of first capacitance peak values of the sensing electrodes during n scanning periods, and changes a distribution range of the raw sensing data when a first average value of the first capacitance peak values is smaller than a capacitance threshold value, wherein n is a positive integer and is smaller than or equal to 2, and the control circuit tracks a plurality of second capacitance peak values of the sensing electrodes during m scanning periods, calculates a contact area and/or a contact strength according to the second capacitance peak values when a second average value of the second capacitance peak values is greater than or equal to the capacitance threshold value, and determines the touch operation signal according to the contact area and/or the contact strength to output the touch operation signal, wherein m is a positive integer and is greater than 2.

10. The input device according to claim 1, wherein the sensing electrodes are disposed within a touch detecting layer.

\* \* \* \* \*